United States Patent
Glugla et al.

(10) Patent No.: US 9,458,773 B2
(45) Date of Patent: Oct. 4, 2016

(54) METHOD AND SYSTEM FOR IGNITION ENERGY CONTROL

(71) Applicant: Ford Global Technologies, LLC, Dearborn, MI (US)

(72) Inventors: Chris Paul Glugla, Macomb, MI (US); Garlan J. Huberts, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 14/279,025

(22) Filed: May 15, 2014

(65) Prior Publication Data

US 2015/0330290 A1 Nov. 19, 2015

(51) Int. Cl.
*F02P 9/00* (2006.01)
*F02P 3/045* (2006.01)
(Continued)

(52) U.S. Cl.
CPC ............ *F02D 19/084* (2013.01); *F02B 17/005* (2013.01); *F02D 19/061* (2013.01); *F02D 19/0689* (2013.01); *F02D 19/0692* (2013.01); *F02D 19/081* (2013.01); *F02D 37/02* (2013.01); *F02D 41/0025* (2013.01); *F02P 3/045* (2013.01); *F02P 3/05* (2013.01); *F02P 5/045* (2013.01); *F02P 5/1502* (2013.01); *F02P 9/002* (2013.01); *F02P 15/006* (2013.01); *F02D 19/0694* (2013.01); *F02D 41/3094* (2013.01);
(Continued)

(58) Field of Classification Search
CPC ........... F02D 19/0689; F02D 19/0692; F02D 19/084; F02D 19/061; F02D 19/0694; F02D 41/402; F02D 41/3094; F02D 37/02; F02B 77/04; F02B 2720/226; F02P 3/04; F02P 3/045; F02P 3/05; F02P 3/0456; F02P 3/051; F02P 3/0853; F02P 3/0869; F02P 9/00; F02P 9/002; F02P 17/10; F02P 15/10; F02P 15/005; F02P 15/006; F02M 21/0284
USPC ................ 123/406.35, 406.19, 609, 406.31, 123/406.12, 406.47, 308, 432, 634, 644, 123/305
See application file for complete search history.

(56) References Cited

U.S. PATENT DOCUMENTS 5,913,302 A * 6/1999 Ruman .................. F02B 77/04
123/609
8,171,912 B2 5/2012 Glugla et al.
(Continued)

FOREIGN PATENT DOCUMENTS

CA 2787806 A1 2/2014

OTHER PUBLICATIONS

Glugla, Chris Paul et al., "Systems and Methods for Controlling Ignition Energy During Exhaust Stroke Combustion of Gaseous Fuel to Reduce Turbo Lag," U.S. Appl. No. 14/030,933, filed Sep. 18, 2013, 55 pages.

(Continued)

*Primary Examiner* — Lindsay Low
*Assistant Examiner* — George Jin
(74) *Attorney, Agent, or Firm* — Julia Voutyras; Alleman Hall McCoy Russell & Tuttle LLP

(57) ABSTRACT

Methods and systems are provided for improving spark robustness. Spark ignition dwell commands are adjusted based on the fuel fraction delivered via direct injection relative to port injection. The approach allows ignition output to better match the ignition requirement of the given fuel combination.

20 Claims, 9 Drawing Sheets

(51) Int. Cl.
*F02D 19/08* (2006.01)
*F02B 17/00* (2006.01)
*F02P 15/00* (2006.01)
*F02P 3/05* (2006.01)
*F02P 5/04* (2006.01)
*F02P 5/15* (2006.01)
*F02D 37/02* (2006.01)
*F02D 41/00* (2006.01)
*F02D 19/06* (2006.01)
*F02M 25/022* (2006.01)
*F02D 41/30* (2006.01)
*F02P 7/00* (2006.01)

(52) U.S. Cl.
CPC ............. *F02M 25/0228* (2013.01); *F02P 7/00* (2013.01); *Y02T 10/36* (2013.01); *Y02T 10/46* (2013.01)

(56) References Cited

U.S. PATENT DOCUMENTS

| | | | |
|---|---|---|---|
| 8,408,191 B2 | 4/2013 | Sellnau et al. | |
| 8,439,011 B2 | 5/2013 | Glugla et al. | |
| 8,543,315 B2 | 9/2013 | Glugla et al. | |
| 2007/0215102 A1* | 9/2007 | Russell | F02D 41/0025 123/310 |
| 2009/0114188 A1* | 5/2009 | Peters | F02D 35/025 123/406.19 |
| 2012/0245827 A1 | 9/2012 | Glugla et al. | |
| 2013/0206106 A1 | 8/2013 | Huberts et al. | |
| 2013/0284148 A1 | 10/2013 | Qu et al. | |
| 2014/0000552 A1 | 1/2014 | Glugla et al. | |
| 2014/0000557 A1 | 1/2014 | Glugla et al. | |
| 2014/0048039 A1 | 2/2014 | Louven et al. | |
| 2014/0297159 A1* | 10/2014 | Surnilla | F02D 41/3094 701/103 |
| 2015/0308362 A1* | 10/2015 | Dunn | F02D 41/3094 123/300 |

OTHER PUBLICATIONS

Huberts, Garlan J. et al., "Spark Plug Fouling Detection for Ignition System," U.S. Appl. No. 14/077,064, filed Nov. 11, 2013, 31 pages.

Glugla, Chris Paul, "Method and System for Pre-Ignirion Control," U.S. Appl. No. 14/289,290, filed May 8, 2014, 40 pages.

* cited by examiner

METHOD AND SYSTEM FOR IGNITION ENERGY CONTROL

FIELD

The present application relates to methods and systems for adjusting spark ignition energy in an engine system configured for direct and port fuel injection of fuels.

BACKGROUND AND SUMMARY

Engines may be configured with direct fuel injectors that inject fuel directly into a combustion cylinder (direct injection), and/or with port fuel injectors that inject fuel into a cylinder air intake port (port fuel injection). Multi-fuel engine systems can use both port and direct injection with different fuel types provided to the different injectors. For example, direct injection of ethanol fuel may be used with port injection of gasoline fuel. Therein, the direct injection of the alcohol fuel may take advantage of the increased charge cooling effects of the alcohol fuel's higher heat of vaporization and increased octane. This helps to address knock limitations, especially under boosted conditions. Direct injection of fuel may also be used during an engine cold start to operate overall leaner than stoichiometry but richer near the spark plug for robust cylinder combustion. Further, the port injection of the gasoline fuel may take advantage of the higher energy density of the gasoline fuel and improved fuel vaporization at lower engine temperatures as compared to that of alcohol fuel.

However the inventors herein have recognized that different ignition system energy outputs and spark duration may be required when injecting different fuels. Further, different ignition system energy outputs and spark duration may be required based on the injection mode (direct or port). Managing the ignition energy output and spark duration may become even more complicated as transitions are made between fuels and injection modes. As such, if the ignition energy output and spark duration are not adjusted to the appropriate level, various issues may occur such as incomplete combustion, over-usage of spark energy, component durability issues, fuel economy and emissions degradation.

In one example, some of the above issues may be at least partly addressed by a method for an engine comprising: adjusting an ignition coil dwell time for a cylinder spark event based on a ratio of fuel received in the cylinder via port injection relative to direct injection. The adjusting may be further based on the type of fuels received via port injection relative to direct injection. Further still, the adjusting may be based on the split of the direct injection including the ratio of fuel direct injected in an intake stroke relative to a compression stroke. In this way, ignition energy and spark duration may be adjusted for different fuel types and different types of injection.

As an example, for a spark event of a cylinder combustion event, ignition coil parameters may be adjusted based on the types of fuel received in the cylinder during the cylinder combustion event, as well as the relative proportion of total cylinder fueling received via a port injector and a direct injector. For example, the cylinder may receive a first amount of a first fuel via the port injector while receiving a second amount of a second, different fuel via the direct injector for the given combustion event. The engine system may be configured with a single ignition coil wherein a charging current is applied for a dwell time on the ignition coil, after which the coil is discharged to the spark plug to initiate the spark event. Herein, the dwell time for which the charging current is applied may be adjusted based on the first and second fuels and based on the ratio of fuel delivery via port and direct injectors. As an example, as the amount of fuel delivered via the direct injector increases, the dwell time may be increased due to charge cooling from the direct injection making in-cylinder compression pressures slightly higher. As such, as the dwell time is increased, the peak charging current applied to the coil increases, increasing the ignition energy output of the culminating spark event.

In an alternate example, the engine system may be configured with a dual ignition coil wherein a first charging current is applied for a first dwell time on a first ignition coil, and a second charging current is applied for a second dwell time on a second ignition coil. After the first dwell time has elapsed, the first coil is discharged to the spark plug to initiate the spark event. While the first coil is discharging, and after a delay since the discharging of the first coil, the second coil is discharged to the spark plug. Herein, the dwell time for each of the first and second ignition coils may be adjusted based on the first and second fuels and based on the ratio of fuel delivery via port and direct injectors. As an example, as the amount of fuel delivered via the direct injector increases, the dwell time of the first and second ignition coils may be increased. In addition, a delay between discharging of the two coils may be decreased to. As elaborated herein, the ignition energy requirement may depend on various factors of the combustion chamber and may vary engine to engine. In general, ignition energy may be increased when the direct injection fuel fraction is higher due to increased charge and compression pressure during discharge. If the direct injected fuel fraction is split into multiple injections, e.g., an intake stroke and a compression stroke direct injection, and if the compression stroke injection is used in a stratified manner, a favorable air-fuel ratio near the spark plug may translate into a lower ignition energy requirement, as well as a lower need for a second discharging.

The adjusting of the dwell time and the delay may also be based on the fuel type delivered via the port injector and the direct injector. For example, the adjusting may be based on a difference in alcohol content of the fuels, or an octane rating of the fuels. Thus, the dwell time for each ignition coil may be lower when the port injected fuel includes gasoline and the direct injected fuel includes E85 as compared with when the port injected fuel includes gasoline and the direct injected fuel includes E10. Furthermore, the dwell time may be adjusted as a function of fuel reactivity (or ignitability). As such, higher reactivity fuels may have a lower ignition energy demand.

In this way, spark energy for a combustion event may be varied by adjusting the dwell command of an ignition coil based on cylinder fueling, the ignition energy output during a spark event in the cylinder may be better managed. In particular, the ignition energy output may better match the ignition output required for combustion of the given combination of fuels and injection types. By increasing the ignition output as fuel delivery via direct injection increases, and fuel delivery via port injection decreases, power consumption of the ignition event is improved. In addition, component durability is increased.

As such, this enables robust combustion with minimal energy usage. In addition, durability of ignition components such as ignition coils and spark plugs is not compromised. Overall, cylinder combustion is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
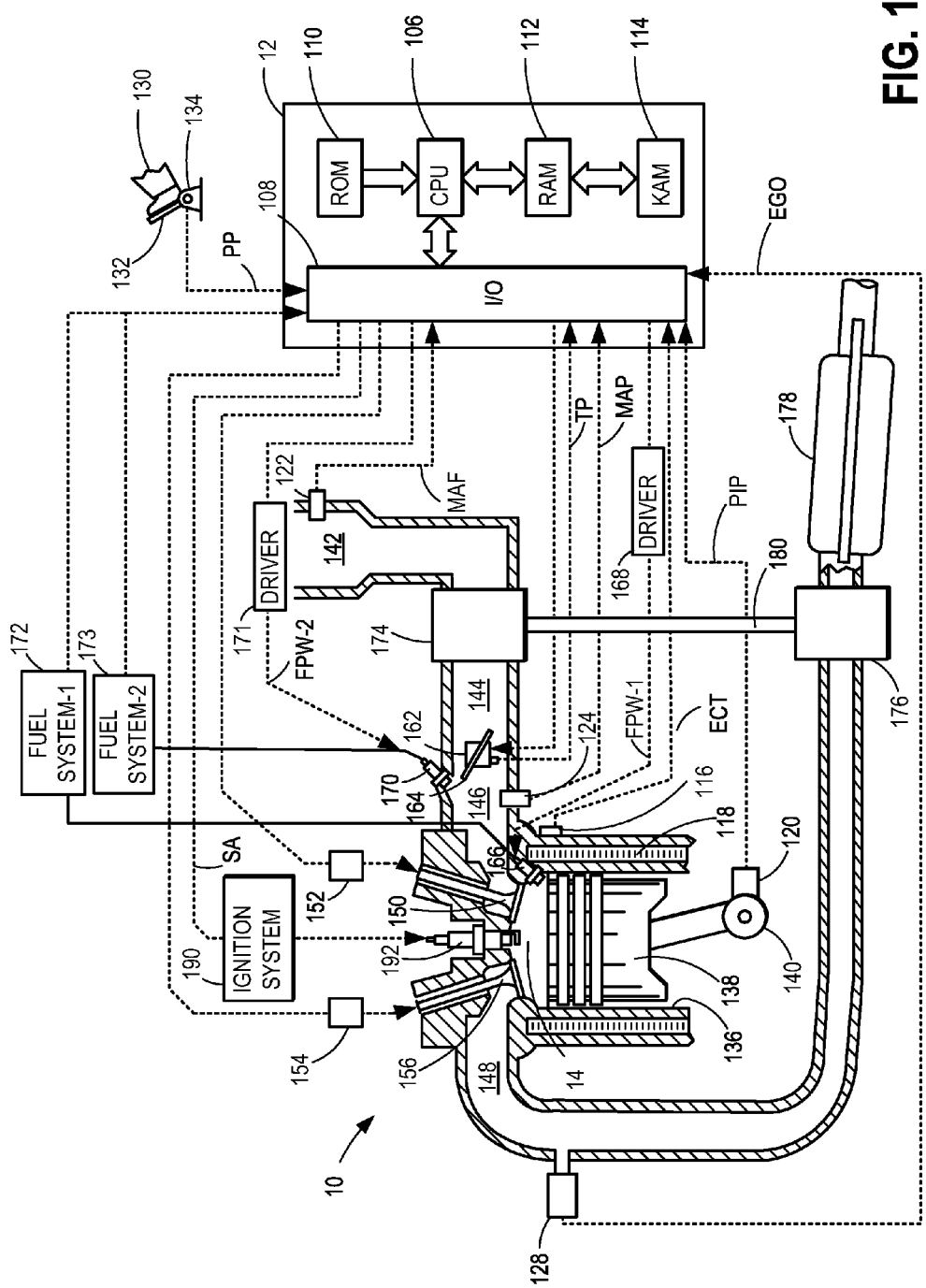
FIG. 1 is a schematic diagram of an engine.
Figure 6:
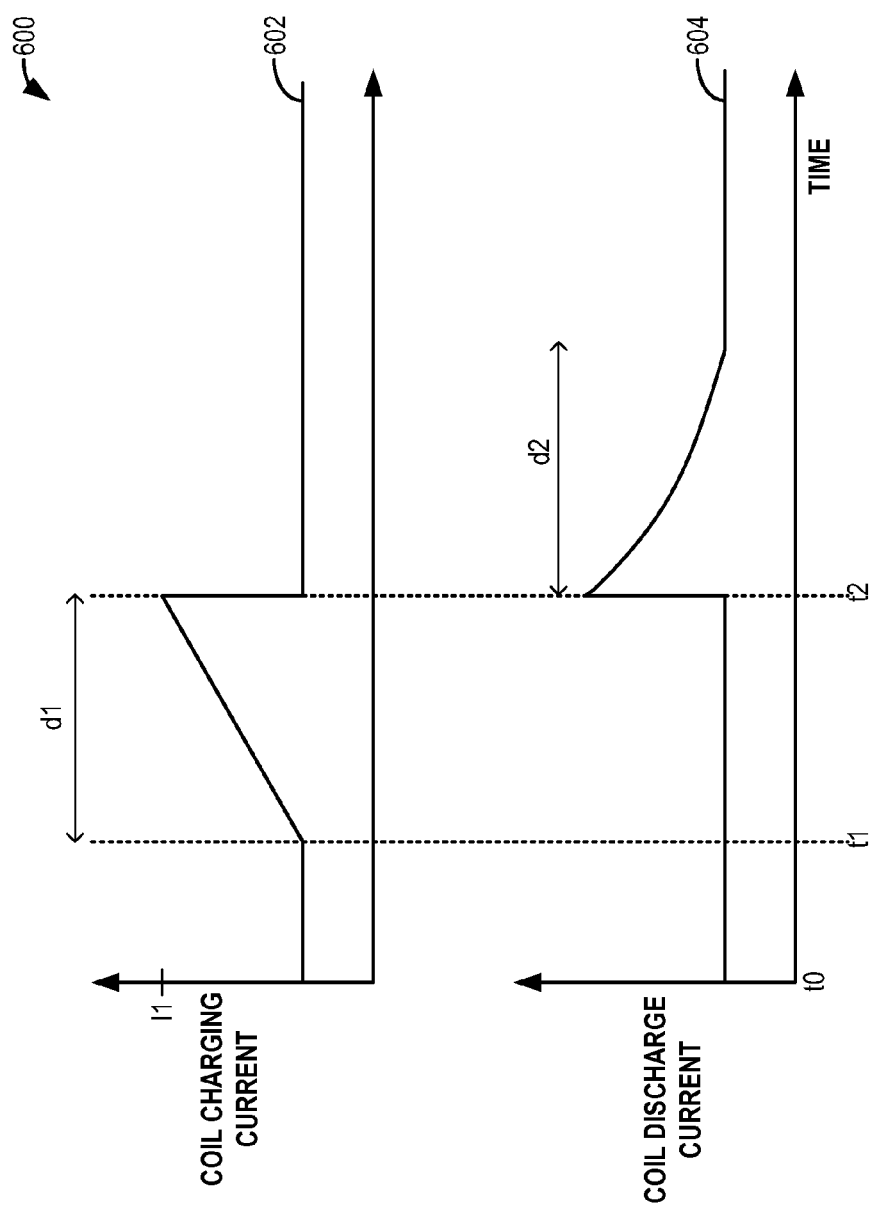
FIG. 6 shows example signals of a single coil ignition system supplying electrical energy to a spark plug during a spark event.
Figure 7:
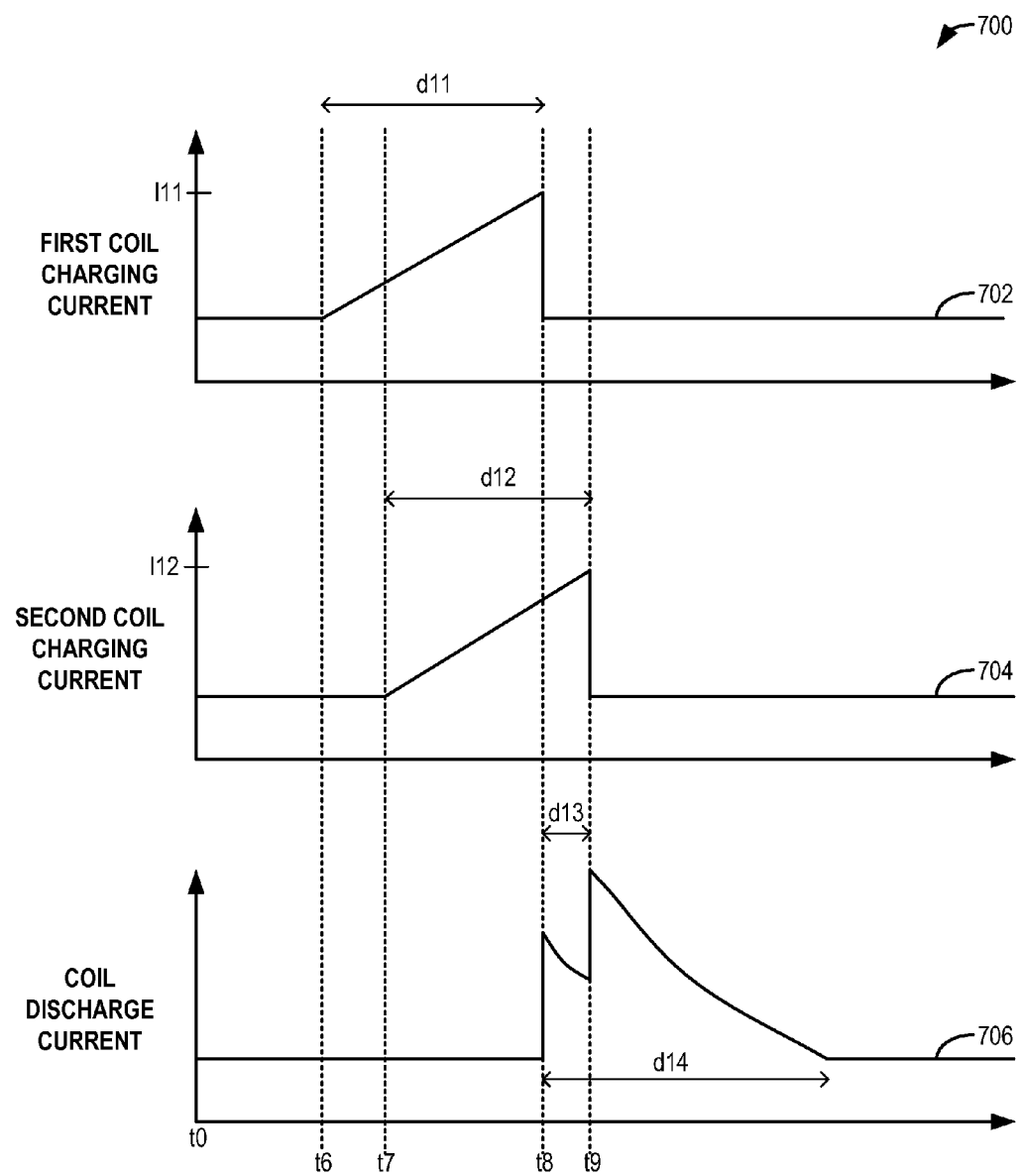
FIG. 7 shows example signals of a dual coil ignition system supplying electrical energy to a spark plug during a spark event.

The present description is related to improved ignition energy management in a spark ignition engine, such as the engine of FIG. 1. The engine may be configured with a single coil ignition system, as described at FIG. 2, or a dual coil ignition system, as described at FIG. 3. An engine controller may be configured to perform a control routine, such as the example routine of FIGS. 4-5, to adjust an ignition coil dwell command (for either ignition system) and a delay in discharging (for dual coil ignition systems) based on cylinder fueling, including based on one or more fuels received in the cylinder and fuel injection type. The controller may accordingly adjust how long a charging current is applied as well as when the ignition coil stored energy is discharged to the spark plug on a given cylinder combustion event (FIGS. 6-7). Example trends are shown with reference to the maps of FIG. 8. An example adjustment in spark output with changing cylinder fueling is shown with reference to FIG. 9.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively be provided upstream of compressor 174. Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system. Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. As elaborated herein at FIG. 2, ignition system 190 may be a single coil ignition system wherein a single ignition coil is electrically coupled to the spark plug. The single coil may be charged by applying a charging current for a defined dwell time, and then discharged to the spark plug to initiate a cylinder spark event. Alternatively, as elaborated herein at FIG. 3, ignition system 190 may be a dual coil ignition system wherein each of a first and second ignition coil are electrically coupled to the spark plug. Each coil may be charged by applying a similar or different charging current for defined dwell times. The coils may then be discharged to the spark plug asynchronously (that is, not simultaneously) to initiate a cylinder spark event. As discussed later, the dwell time of the charging current, as well as the delay between discharge events, may be adjusted based on cylinder fueling to improve matching of the resulting ignition output with an ignition output required to provide robust cylinder combustion under the given fueling conditions.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the low volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel systems 172 and 173 may hold fuel with different fuel qualities, such as different fuel compositions. These differences may include different alcohol content, different octane, different heats of vaporization, different fuel blends, different fuel volatilities, and/or combinations thereof etc. One example of fuels with different alcohol contents could include gasoline as a first fuel with a lower alcohol content and an ethanol fuel blend (such as E85) as a second fuel with a greater alcohol content. In another example, the engine may use ethanol fuel blends of varying alcohol content as the first and second fuel, such as E10 (which is approximately 10% ethanol and 90% gasoline) as the first fuel that is port injected and E85 (which is approximately 85% ethanol and 15% gasoline) as a second fuel that is direct injected.

Other feasible substances include water, a mixture of alcohol and water, a mixture of alcohols etc. As another example, fuels with different volatility could include fuel of different alcohol content, or fuels of different seasonal or regional grades (e.g., a winter grade fuel and a summer grade fuel, or a northern grade fuel and a southern grade fuel). Additionally, the first and second fuels may also differ in other fuel qualities such as a difference in temperature, viscosity, octane number, etc.

In the depicted embodiment, engine 10 is a multi-fuel engine system such that the fuel stored in fuel system-1 172 and delivered by fuel injector 166 is different from the fuel stored in fuel system-2 173 and delivered by fuel injector 170. As a non-limiting example, the first fuel delivered by port injection may be a first fuel having a lower alcohol content, while the second fuel delivered by direct injection may be a second fuel having a higher alcohol content. As elaborated below, the engine controller may adjust fuel injection profiles during an engine start, crank, and idle speed control to leverage the fuel properties of the different fuels available in the fuel system, as well as the benefits of port and direct injection to reduce exhaust gaseous and PM emissions.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine speed, load, exhaust temperature, PM emissions, etc. The relative distribution of the total amount of first fuel port injected by injector 170 and the total amount of second fuel direct injected (as one or more injections) by direct injector 166 may be referred to as an injection ratio. For example, injecting a larger amount of the first fuel for a combustion event via (port) injector 170 may be an example of a higher first ratio of port to direct injection, while injecting a larger amount of the second fuel for a combustion event via (direct) injector 166 may be a lower first ratio of port to direct injection. Note that these are merely examples of different injection ratios, and various other injection ratios may be used.

Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the intake stroke, multiple injections during the compression stroke, or a combination of some direct injections during the intake stroke and some during the compression stroke. When multiple direct injections are performed, the relative distribution of the total amount of second fuel directed injected between an intake stroke (direct) injection and a compression stroke (direct) injection may be referred to as a split ratio. For example, direct injecting a larger amount of the second fuel for a combustion event during an intake stroke may be an example of a higher split ratio of intake stroke direct injection, while injecting a larger amount of the second fuel for a combustion event during a compression stroke may be an example of a lower split ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the intake stroke, compression stroke, or any appropriate combination thereof The ignition system energy output may vary not only based on engine operating conditions such as an engine speed and load, but also based on the fuel being injected into the cylinder as well as the injection type. For example, cylinder combustion of a direct injected fuel may require higher ignition energy output than the same fuel when delivered via port injection.

As another example, cylinder combustion of a direct injected fuel with a higher alcohol content may require higher ignition energy output than a direct injected fuel with a lower alcohol content. In general, a higher direct injected fraction of a higher percentage ethanol fuel may need a higher ignition output since the cooling from direct injected alcohol blend will increase the cylinder air charge and pressure that the spark plug is discharged into.

Figure 8:
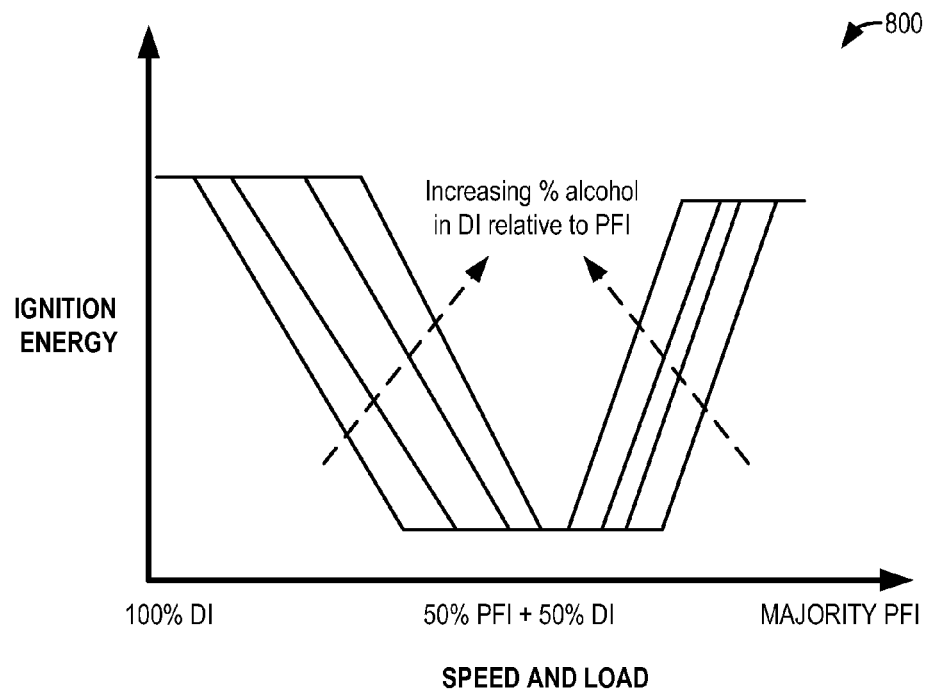
FIG. 8 shows example trends in change in ignition control signals as cylinder fueling changes.
Figure 8:
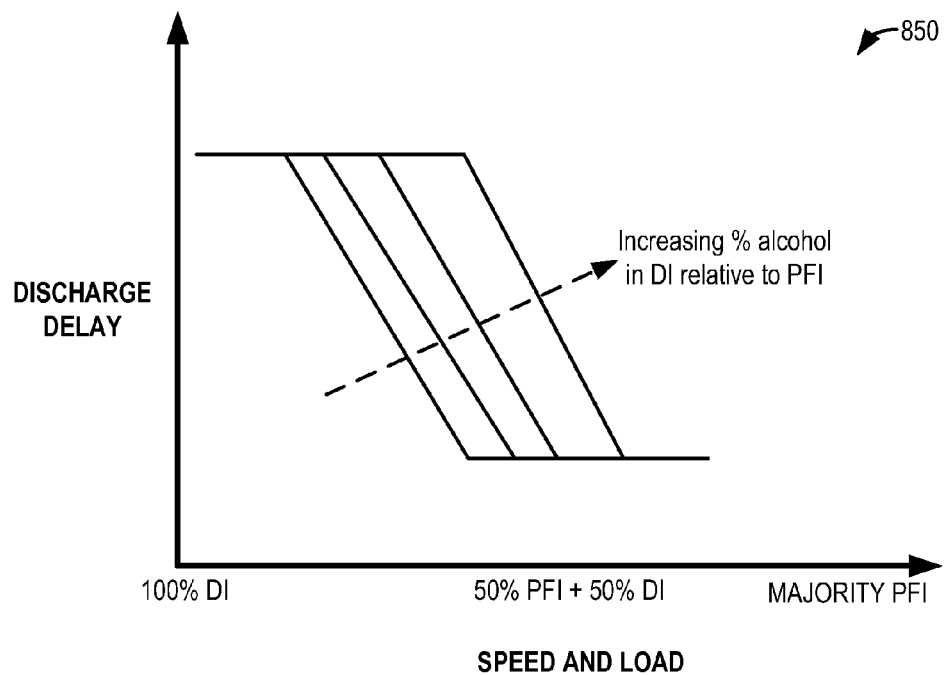

To enable improved ignition output management as cylinder fueling contribution from each of the port and direct injector varies over engine cycles, a controller may adjust the ignition output of a cylinder spark event based on cylinder fueling. Specifically, as elaborated at FIGS. 4-5, the ignition output may be adjusted based on a proportion of total cylinder fueling (for a given cylinder combustion event) that is provided by a first fuel via port injection relative to a second fuel that is provided by direct injection. Example trends are shown at the maps of FIG. 8. By adjusting the ignition coil dwell command to better match the ignition output of spark event to the ignition output desired for a given fuel injection ratio, combustion robustness is increased without wasting spark energy.

It will be appreciated, however, that ignition energy requirements may also depend on various operating conditions. For example, at high engine speeds and loads, the direct injection fuel pressure may cause more in-cylinder motion and the ignition event may be more susceptible to a spark blow out. However, at light and medium engine speeds and loads, if stratified compression stroke direct injection is used, the ignition event may be easier due to a favorable air-fuel ratio in the vicinity of the spark plug.

As described above, FIG. 1 shows only one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller are described at FIGS. 4-5.

Figure 2:
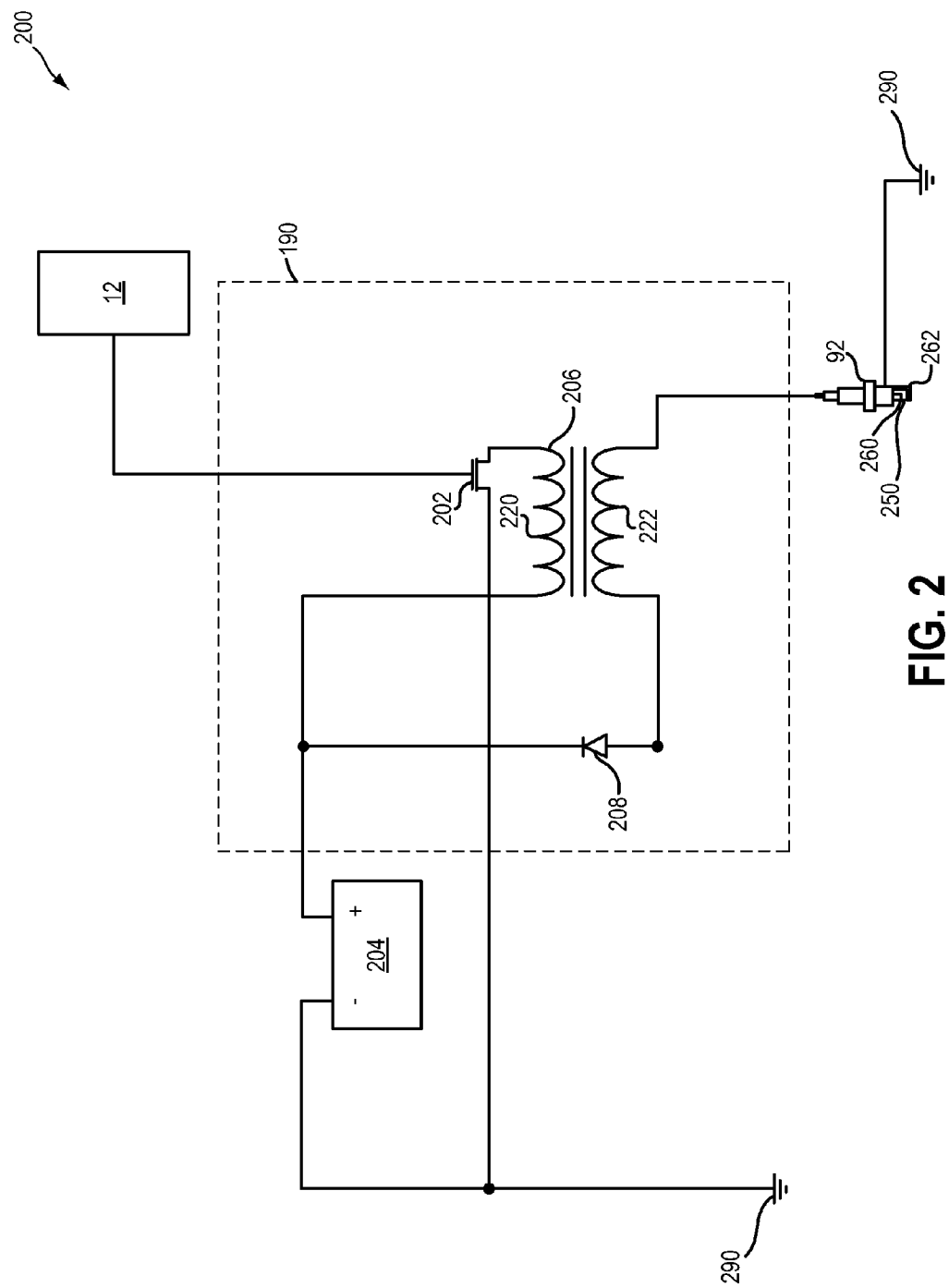
FIG. 2 is a schematic diagram of a single coil ignition system that may be coupled to the engine system of FIG. 1.

Referring now to FIG. 2, an example circuit 200 for a single coil ignition system is described. The circuit of FIG. 2 may be included in the engine system of FIG. 1, such as at ignition system 190.

Battery 204 supplies electrical power to ignition system 190 and controller 12. Controller 12 operates switch 202 to charge and discharge ignition coil 206. Ignition coil 206 includes primary winding 220 and secondary winding 222. Ignition coil 206 charges when switch 202 closes to allow current to flow from battery 204 to ignition coil 206. The charging current may be applied to ignition coil 206 for a defined duration, known herein as a dwell period. By adjusting the dwell period, the peak charging current applied on ignition coil 206 is varied, as elaborated at FIG. 7. Ignition coil 206 discharges when switch 202 opens after the dwell period has elapsed, that is, after current has been flowing to ignition coil 206.

Secondary winding 222 supplies energy to spark plug 92. Spark plug 92 generates a spark when voltage across electrode gap 250 is sufficient to cause current to flow across electrode gap 250. Spark plug includes center electrode 260 and a side electrode 262. Voltage is supplied to center electrode 260 via secondary coil 222. Side electrode 262 is electrically coupled to ground 290. The low voltage end of the secondary winding is electrically connected to the positive terminal of battery 204 either directly or optionally through diode 208. The diode is used to prevent conduction through the spark plug during dwell. While the present example shows a negative firing ignition coil, the circuitry may also be applicable to a positive firing ignition coil, wherein the polarity of diode 208 is reversed.

Figure 3:
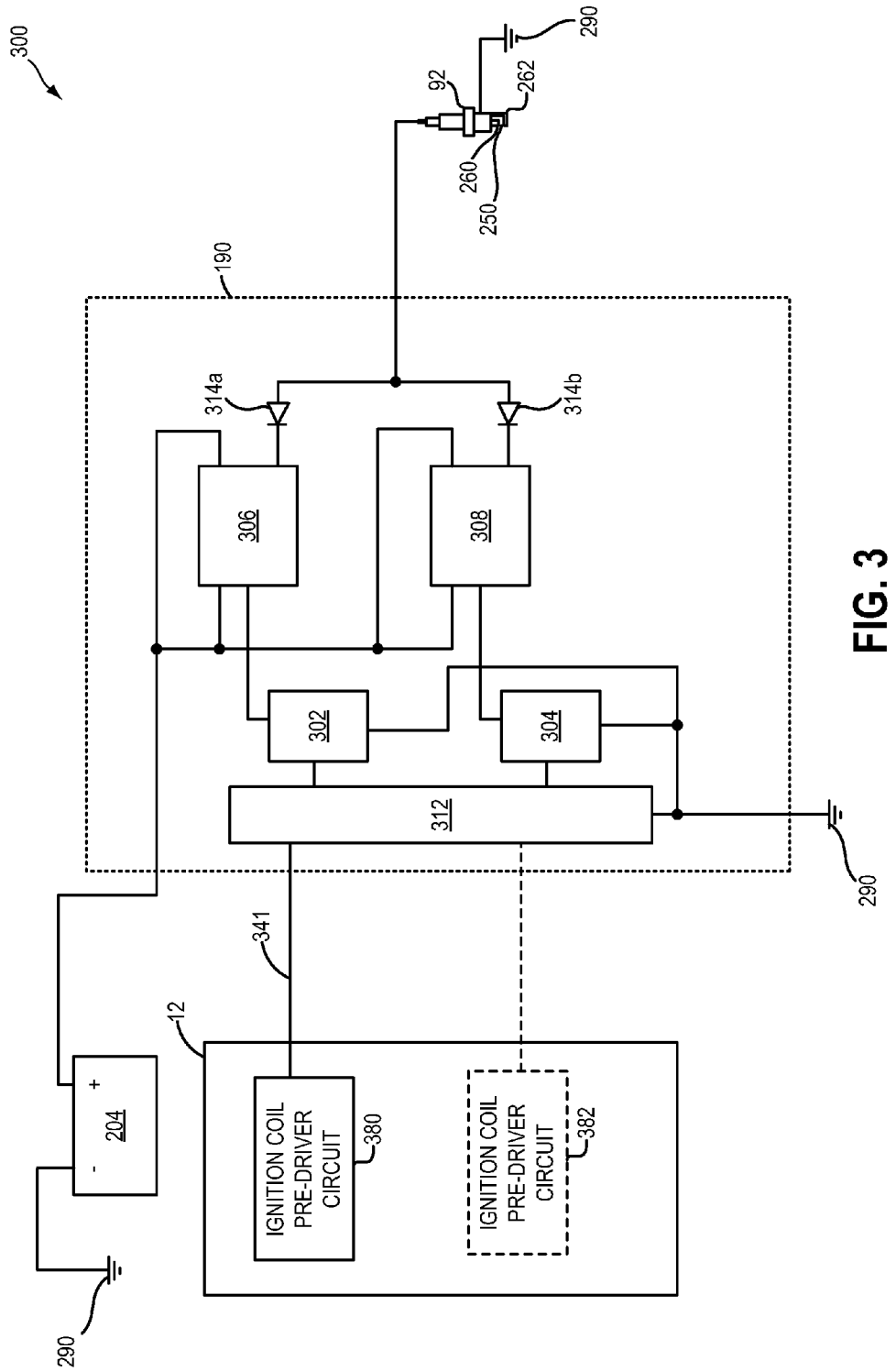
FIG. 3 shows an example schematic diagram of a dual coil ignition system that may be coupled to the engine system of FIG. 1.

Referring now to FIG. 3, an example embodiment 300 of a dual coil ignition system is shown. The circuit of FIG. 3 may be included in the engine system of FIG. 1, such as at ignition system 190. The ignition system of FIG. 3 includes some of the same elements as those shown in the system of FIG. 2. Once introduced, element numbering is maintained and the element not reintroduced.

In the ignition circuit 300 of FIG. 3, controller 12 includes a single ignition coil pre-driver circuits 380 for two ignition coils 306 and 308 that may be operated to supply electrical energy to a single spark plug of a single cylinder. In an alternate example, two ignition coil pre-driver circuits 380 and 382 may be provided, one for each ignition coil. Pre-driver circuit 380 is configured to supply low level current to ignition coil drivers 302 and 304 via interpretive logic 312, as detailed below. Ignition coil drivers 302 and 304 are included in ignition system 190 which may be positioned on top of or near spark plug 92. Pre-driver circuit 380 may supply a first signal to first ignition coil driver 302. First ignition coil 306 is selectively supplied a first charging current for a first dwell time via first coil driver 302. Electric energy storage device 204 (e.g., a battery) sources electrical current to first ignition coil 306. Similarly, pre-driver circuit 380 (or optional pre-driver circuit 382, when included) may supply a second signal to second ignition coil driver 304. Second ignition coil 308 is selectively supplied a second charging current for a second dwell time via second coil driver 304. Electric energy storage device 204 sources electrical current to second ignition coil 308. Pre-driver circuit 380 delivers the two different signals via a single conductor 341 to operate first ignition coil 306 and second ignition coil 308. Alternatively, when optional pre-driver circuit 382 is included, the two different signals are provided via respective conductors.

Spark plug 92 may be supplied electrical energy from each of first ignition coil 306 and second ignition coil 308 during a given spark event. Spark plug 92 includes a first center electrode 260 and a second side electrode 262. Second electrode 262 may be in continuous electrical communication with ground 290. A spark may develop across gap 250 when an electrical potential difference exists between center electrode 260 and side electrode 262.

High voltage diodes 314a, 314b are reverse biased when ignition coils 306, 308 charge. The diodes become forward biased when the respective output of one of the ignition coils is of higher magnitude than the other ignition coil. In this manner the outputs of both coils are combined into one spark plug. While the present example shows negative firing ignition coils, the circuitry may also be applicable to positive firing ignition coils, wherein the polarity of the diodes is reversed.

In the dual coil ignition system 300 of FIG. 3, where the engine includes N cylinders, N ignition coil pre-driver circuits provide control signals for ignition coils. Specifically, the output of pre-driver circuit 380 is directed to interpretive logic 312. Interpretive logic 312 may be included in a programmable logic array, as part of logic programmed into a central processing unit or an application specific integrated circuit (ASIC). Interpretive logic 312 monitors the timing and level of a signal provided by pre-driver circuit 380. The signals supplied to ignition coil drivers 302 and 304 by interpretive logic 312 may be synchronous with cylinder strokes of the cylinder being supplied spark via first ignition coil 306 and second ignition coil 308. In one example, at least one spark is provided during each cycle of the cylinder receiving spark from first ignition coil 306 and/or second ignition coil 308. For example, a spark may be supplied once a cylinder cycle during a compression stoke of the cylinder receiving spark. Further, in one example, first ignition coil 306 may have a different inductance than second ignition coil 308. In alternate embodiments, pre-driver circuit 380 and interpretive logic 302 may serve to operate the ignition coils of cylinders N through the total number of engine cylinders.

Thus the system of FIG. 2 depicts an ignition system for an engine cylinder including a single spark plug. The ignition system includes a single ignition coil electrically coupled to the single spark plug. In comparison, the system of FIG. 3 depicts an ignition system for an engine cylinder including a single spark plug wherein the ignition system includes a first ignition coil and a second ignition coil, each electrically coupled to the single spark plug. The engine system includes a port injector for port injecting a first fuel to the cylinder and a direct injector for direct injecting a second fuel to the cylinder. The first and second fuels may vary in composition, octane rating, etc. For example, the first fuel may be a liquid fuel with a lower octane rating, a lower alcohol content, etc. As non-limiting examples, the first fuel may include one of gasoline, E10, etc. The second fuel may be another liquid fuel or a gaseous fuel, the second fuel having a higher octane rating, a higher alcohol content, etc. As non-limiting examples, the second fuel may include one of CNG, E50, E85, etc. By delivering different fuels to the cylinder via the different injectors, the specific properties of the different fuels as well as the different injection types may be leveraged. In still other examples, a common fuel may be delivered to the cylinder via the different injectors wherein the different injection types may leverage the properties of the injection system only.

As will be elaborated herein, during a cylinder combustion event, an engine controller may adjust an ignition output for a cylinder spark event based on cylinder fueling for the given cylinder combustion event. In particular, an ignition output for the cylinder's spark event may be varied based on the types of fuels received in the cylinder, their relative proportion in the total amount of cylinder fueling, as well as their injection type. In general, the direct injection has a larger influence on required ignition energy. Specifically, direct injection air charge cooling effects lead to increased charge density and an increased energy requirement to jump the spark gap at higher pressures. Also the high pressures at which the direct injected fuel is delivered at may cause more in-cylinder motion, and depending on injector targeting, may exacerbate spark blow-out at higher engine speeds. Finally, compression stroke injection or centrally located direct injection systems (as compared to a side location) may create stratified charge with a local air-fuel ratio in the vicinity of the spark plug that creates more favorable ignitability. As a result, the combination may reduce ignition energy requirements, such that a favorable combustion event may be achieved with a lower ignition energy spark event.

For example, in an engine system receiving gasoline and E85, the ignition output may be adjusted based on the injection ratio of gasoline:E85, as well as based on whether gasoline was port injected and E85 was direct injected or whether gasoline was direct injected and E85 was port injected. The ignition output may be adjusted by at least adjusting the dwell command or dwell period of the ignition coil charging current, as commanded by the pre-driver circuit coupled to the ignition coil. Typically, by increasing the dwell period or dwell command, the peak charging current applied to the ignition coil can be increased, increasing the ignition output of the coil during the subsequent discharging. In the case of a dual coil system, the ignition output is adjusted not only by adjusting the charging current of each of the two ignition coils, but also based on a time elapsed (or delay) between discharging of the first ignition coil and discharging of the second ignition coil. By adjusting the delay (e.g., increasing up to a threshold), the duration of the spark event is increased, improving combustion robustness.

Figure 4:
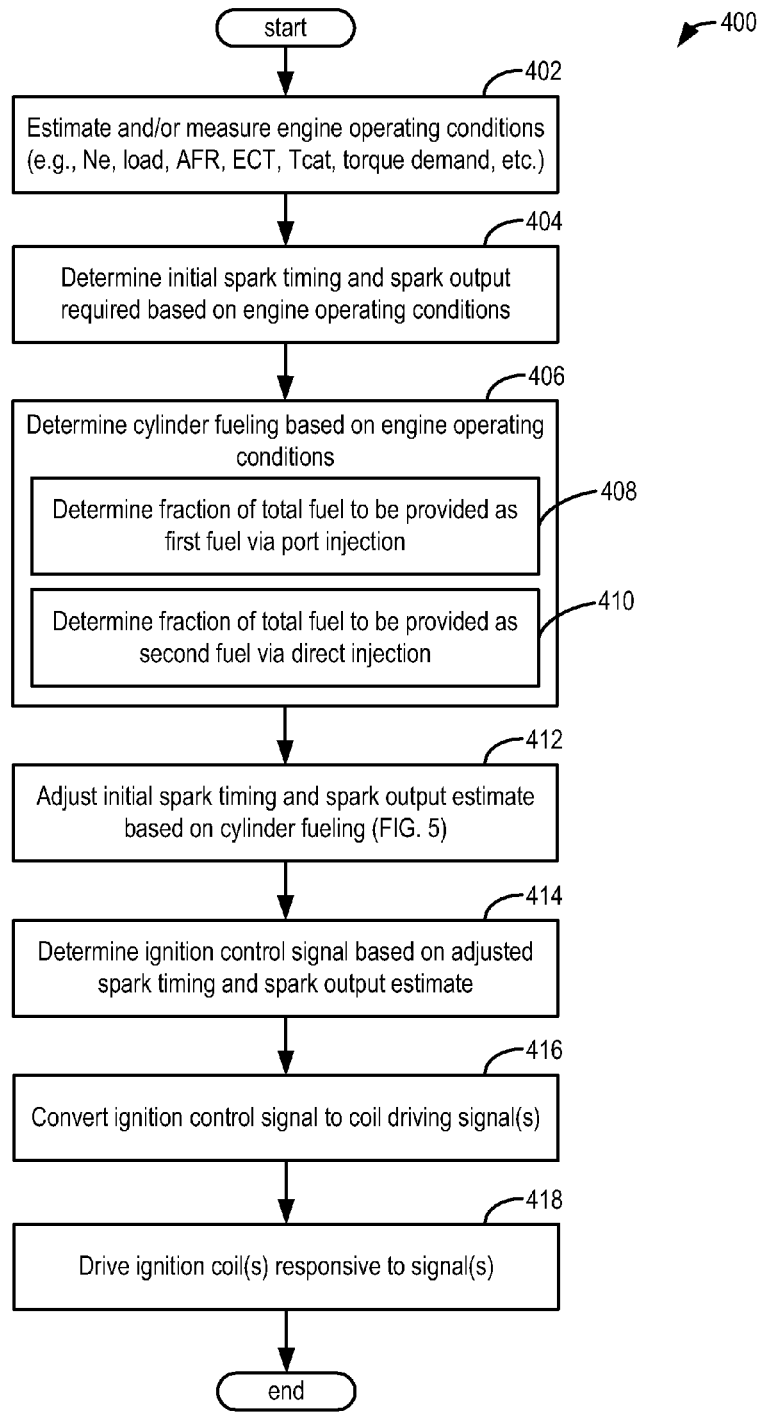
FIG. 4 shows a high level flow chart for adjusting a spark ignition output during a spark event based on cylinder fueling.

Turning now to FIG. 4, an example routine 400 is shown for adjusting an ignition output for a cylinder spark event of a cylinder combustion event based on engine operating conditions via adjustments to an ignition coil drive command.

At 402, the routine includes measuring and/or estimating engine operating conditions. Engine operating conditions determined may include but are not limited to engine speed, engine load, engine air-fuel ratio, engine EGR amount, operator torque command, exhaust catalyst temperature, time since engine start, fuel level in fuel tank(s), fuels available, etc. Routine 400 proceeds to 404 after engine operating conditions are determined.

At 404, the routine includes determining an initial spark timing and spark energy required to be delivered to a single spark plug of an engine cylinder for the upcoming cylinder combustion event via a single ignition coil (in a single coil ignition system) or two ignition coils (in a dual coil ignition system) based on the estimated operating conditions. In one example, the initial spark timing estimate includes an engine spark advance estimate that is empirically determined and stored in a table indexed via engine speed and load. The initial spark output (which is an ignition energy output) may be likewise empirically determined from a look-up table stored in the controller's memory as a function of engine speed and load. In some examples, the spark estimate that is output from the table may be further modified based on one or more functions that modify spark advance in response to engine EGR amount and/or engine air-fuel ratio to determine the initial spark ignition output estimate. As will be elaborated below, the initial estimate may be subsequently further adjusted based on cylinder fueling.

Next, at 406, cylinder fueling may be determined based on the estimated engine operating conditions. This includes determining a total amount of fuel to be injected into the cylinder for the upcoming cylinder combustion event. In addition, an injection ratio of fuels may be determined. This includes, at 408, determining a proportion of the total amount of fuel to be delivered to the cylinder as a first fuel via port injection. Further, at 410, the cylinder fueling includes determining a proportion of the total amount of fuel to be delivered to the cylinder as a second fuel via direct injection. In some examples, the same fuel may be delivered to the cylinder via each of the port and direct injectors. Herein, the injection ratio reflects the proportion of the total amount of fuel to be received in the cylinder via port injection relative to the proportion of the total amount of fuel to be received in the cylinder via direct injection.

At 412, the routine includes adjusting the initial spark estimate (determined at 404) based cylinder fueling (determined at 406). As elaborated at FIG. 5, the spark output may be adjusted to account for differences in spark output requirement for different fuels, and different injection types. For example, the spark output requirement for a first injection mode with only port injection may be different from the requirement for a second injection mode with only direct injection, and a third injection mode with at least some port injection and at least some direct injection. In particular, the spark requirement for the first injection mode may be lower than the second injection mode and higher than the third injection mode. As discussed above, the spark output requirement for each injection mode may be, in addition, dependent on the combustion system design. Consequently, increasing ignition energy with increased direct injected fuel fraction may be true for one engine system, while on another engine system, ignition energy may be increased with decreased direct injected fuel fraction or increased port injected fuel fraction.

The spark requirement may be further adjusted based on the first fuel received in the cylinder via the port injector relative to the second fuel received in the cylinder via the direct injector, such as based on their relative alcohol content, relative octane rating, etc. Example trends are elaborated with reference to the maps of FIGS. 8 herein below.

At 414, the routine includes adjusting at least one ignition spark control signal (or signal attribute) based on the updated spark timing and spark energy estimate. In dual coil ignition systems, at least two spark control signal attributes may be determined based on the revised spark timing and energy. In one example, the spark control signal may include one or more of a spark dwell command, a spark charging current, and a crankshaft angle at which the spark dwell command is sent to the ignition coil(s). In another example, the spark control signal may be crankshaft angles at which two spark dwell commands are supplied to the two ignition coils of a dual coil ignition system. The dwell commands may be output synchronous with engine position for each cylinder cycle. Further, an ignition command pulse duration supplied to each ignition coil, and/or delay between discharging of ignition coils (in a dual coil system) may be determined.

At 416, the routine includes converting the determined control signal to a coil driving signal. The coil driving signal determines when charging and discharging of one or more ignition coils that supply energy to a single spark plug occurs.

In one example, where control of charging a single ignition coil supplying energy to a single spark plug is directed via a single command signal (e.g., in a single coil ignition system), the routine interprets the single command signal and outputs a dwell signal to the single ignition coil. In another example, where control of charging two ignition coils supplying energy to a single spark plug is directed via a single command signal (e.g., in a dual coil ignition system), the routine interprets the single command signal and outputs distinct dwell signals to each of the two ignition coils.

At 418, the routine includes driving the ignition coil (or coils) with the determined current. Each ignition coil charges when the dwell signal allows current flow to the ignition coil. The ignition coil is then discharged when current flow to the ignition coil ceases. In one example, the ignition coil(s) may be supplied current via a field effect transistor or another type of switching device. Routine 400 proceeds to exit after the ignition coil(s) has supplied energy to a single spark plug. In other words, the routine is started before the spark event for an upcoming cylinder combustion event and is exited after the spark event for the given cylinder combustion event. The routine is then repeated before the spark event for each cylinder combustion event.

In one example, routine 400 adjusts a spark attribute supplied to a single conductor that carries a command signal referenced to ground, where the command signal includes spark timing and dwell information for each of two ignition coils that provide energy to a single spark plug.

A single conductor may be supplied for each engine cylinder. The single attribute may include supplying a pulse width of a signal including a duration. The duration of the pulse width may be a basis for supplying an amount of charge to each of the two ignition coils. The timing of the pulse width may be a basis for starting and/or ending ignition coil charging for each of the two ignition coils. The pulse width may be for a high or a low level portion of a signal. The pulse width may also determine the order of charging and discharging of the two ignition coils.

Figure 5:
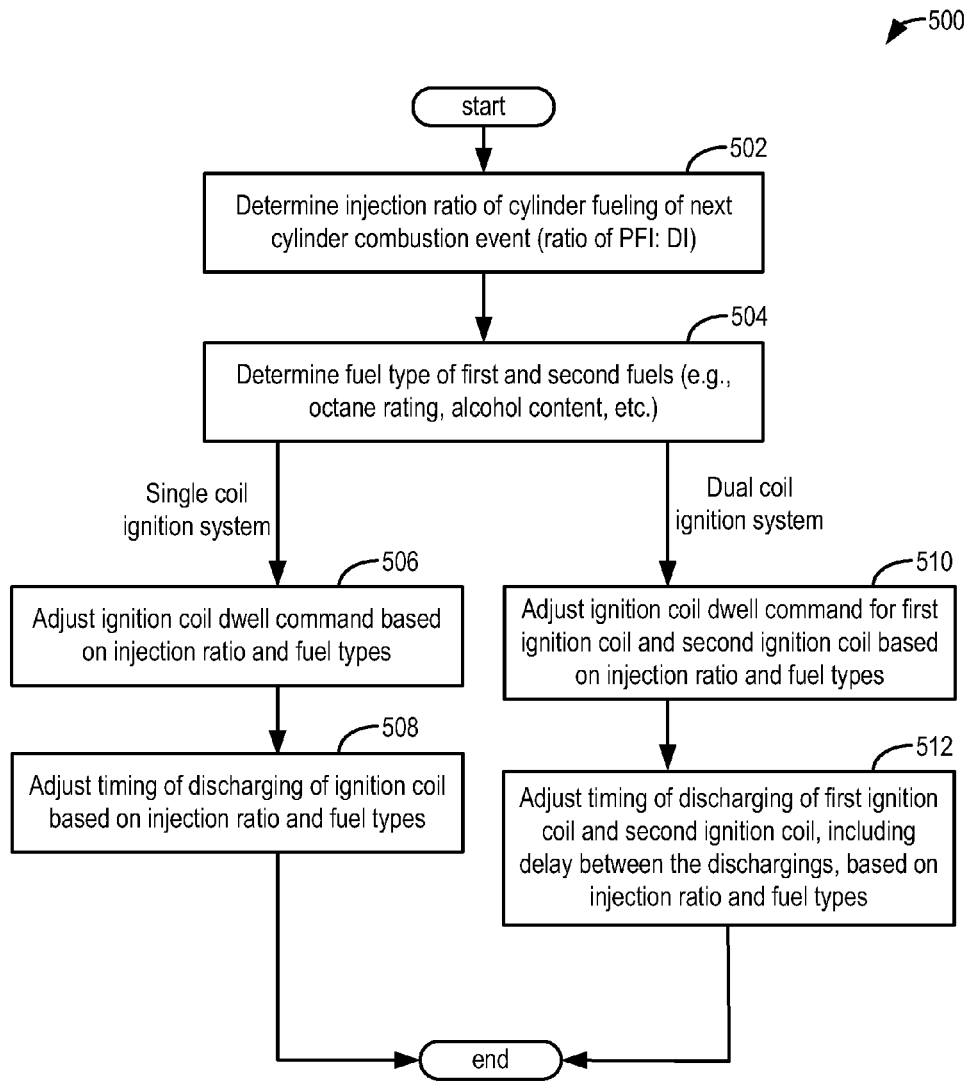
FIG. 5 shows a high level flow chart for adjusting an ignition coil dwell command and delay based on cylinder fueling.

Turning now to FIG. 5, an example routine 500 is shown for adjusting an ignition output based on cylinder fueling, including fuel types and injection ratios. The method allows ignition output to be varied to better match and compensate for changes in fuel type and fuel injection type over cylinder combustion events.

At 502, the routine determines the injection ratio of cylinder fueling for the next cylinder combustion event. Specifically, the routine determines the proportion of a total amount of fuel that is being received in the cylinder via port injection relative to the proportion of the total amount of fuel that is being received in the cylinder via direct injection. At 504, the routine determines the fuel type of the first and second fuels received in the cylinder. Specifically, the routine determines a first fuel received in the cylinder via the port injector relative to a second fuel received in the fuel received in the cylinder via the direct injector. The controller may determine the difference in fuel alcohol content or octane rating between the two fuels, as an example.

The routine then proceeds to steps 506-508 if the ignition system is a single coil ignition system. Else, the routine proceeds to steps 510-512 if the ignition system is a dual coil ignition system.

At 506, where the engine includes a single coil ignition system, the routine includes adjusting the ignition coil dwell command based on the injection ratio and fuel types. Next at 508, the routine includes adjusting the timing of discharging of the ignition coil based on the injection ratio and fuel types. For example, the routine may include adjusting from an initial dwell command (or initial dwell time) based on engine operating conditions including engine speed and load to a final dwell command (or final dwell time) based on the fuel(s) received in the cylinder via port injection relative to direct injection.

A controller may use distinct dwell tables for the proportion of port injection and the proportion of direct injection. For example, the controller may refer to a first dwell table to determine a port injection based dwell command. In the first dwell table, a dwell command output for the single ignition coil is stored as a function of amount or proportion of fuel that is port injected. Likewise, the controller may refer to a second dwell table to determine a direct injection based dwell command. In the second dwell table, a dwell command output for the single ignition coil is stored as a function of amount or proportion of fuel that is direct injected. The controller may then interpolate the outputs of the two tables to determine the final dwell command. For example, the values may be interpolated via the use of a multiplier or adder function.

In one example, the adjusting includes in response to a higher proportion of the total amount of fuel being delivered via direct injection, increasing the ignition coil dwell command or dwell time, and in response to a higher proportion of the total amount of fuel being delivered via port injection, decreasing the ignition coil dwell command or dwell time.

The adjusting may further include, as the alcohol content of the second fuel delivered via direct injection increases, increasing the ignition coil dwell time; and as the alcohol content of the first fuel delivered via port injection increases, increasing the ignition coil dwell time.

At 510, where the engine includes a dual coil ignition system having a first ignition coil and a second ignition coil coupled to a common cylinder spark plug, the routine includes adjusting each of a first ignition coil dwell command for the first ignition coil and a second ignition coil dwell command for the second ignition coil based on the injection ratio and fuel types. Next at 512, the routine includes adjusting each of the timing of discharging of the first ignition coil and the second ignition coil based on the injection ratio and fuel types. As such, this includes adjusting a delay time between the discharging of the first ignition coil and the discharging of the second ignition coil based on the cylinder fueling, including the injection ratio and the fuel types.

A controller may use distinct dwell tables for the proportion of port injection and the proportion of direct injection. For example, the controller may refer to a first dwell table to determine a port injection based dwell command. In the first dwell table, a dwell command output for each of the two ignition coils as well as a delay time between their discharging may be stored as a function of amount or proportion of fuel that is port injected. Likewise, the controller may refer to a second dwell table to determine a direct injection based dwell command. In the second dwell table, a dwell command output for each of the two ignition coils as well as a delay time between their discharging may be stored as a function of amount or proportion of fuel that is direct injected. The controller may then interpolate the outputs of the two tables to determine the final dwell command. For example, the values may be interpolated via the use of a multiplier or adder function. For example, a first speed-load look-up table may be used having values for port fuel injection amounts and a second speed-load look-up table may be used having values for direct fuel injection amounts. The final dwell time applied may be calculated as:

$$Dwell\_total = PFI\text{ fraction}(dwell\_PFI) + (1 - PFI\text{fraction})(dwell\_DI),$$

where dwell_PFI is an output from the first look-up table and dwell DI is an output from the second look-up table.

In one example, the adjusting includes, in response to a higher proportion of the total amount of fuel being delivered via direct injection, increasing the dwell time of each of the first ignition coil and the second ignition coil, and in response to a higher proportion of the total amount of fuel being delivered via port injection, decreasing the dwell time of each of the first ignition coil and the second ignition coil. In another example, the dwell time of the first ignition coil may be increased while the dwell time of the second ignition coil is decreased as the relative proportion of cylinder fueling via the direct injector increases. As yet another example, the time elapsed between the discharging of the first ignition coil and the discharging of the second ignition coil may be increased as the relative proportion of cylinder fueling via the port injector increases. In still another example, wherein the first ignition coil is charged and discharged earlier than the second ignition coil, the adjusting may include increasing a delay time between discharging of the first coil and discharging of the second coil as the proportion of the total amount of fuel delivered via the direct injection increases. In each case, the ignition energy requirement may be calibrated to the needs of the specific combustion chamber or engine system.

In this way, during a cylinder spark event, the routine includes adjusting a dwell time of each of a first ignition coil and a second ignition coil coupled to a cylinder spark plug based on cylinder fueling via a direct injector and via a port injector. The routine further includes adjusting a time elapsed between discharging of the first ignition coil and discharging of the second ignition coil based on the cylinder fueling. As discussed above, the cylinder fueling includes a first fuel received in the cylinder via the port injector and a second fuel received in the cylinder via the direct injector, and further includes a relative proportion of the cylinder fueling received via the direct injector as compared to the port injector. In one example, the dwell time of the first ignition coil is increased and the dwell time of the second ignition coil is decreased as a difference in alcohol content (or a different in octane rating) between the first fuel and the second fuel increases. Likewise, the time elapsed between discharging of the first ignition coil and discharging of the second ignition coil is varied as the difference in alcohol content between the first fuel and the second fuel increases. Thus, a higher direct injected fraction of a higher percentage ethanol fuel may need a higher ignition output since the cooling from direct injected alcohol blend will increase the cylinder air charge and pressure that the spark plug is discharged into. By running the ignition energy closer to what is actually required in lieu over always providing excess energy, parasitic losses are reduced, and component durability is increased, along with lower component operating temperatures. Thus, by adjusting the ignition output based on the alcohol content of the injected fuel, as well as based on a proportion of fuel that is direct injected, spark event efficiency and spark plug durability is improved.

Referring now to FIG. 6, example signals of a single ignition coil supplying electrical energy to a spark plug are shown at map 600. The signals may be provided by the single coil ignition system shown in FIG. 2. Map 600 depicts a coil charging current over time at plot 602 and a coil discharging current over time at plot 604. Plots 602 and 604 are plotted over time (along the x-axis). Vertical markers t0-t2 represent times of interest during the sequence.

At time t0, the ignition coil is neither charging nor discharging. An ignition coil may not be charging or discharging during an intake or exhaust stroke of the cylinder receiving the spark, for example.

At time t1, current begins to flow into the ignition coil at a primary side in response to a desired spark timing based on engine speed and load, and further based on cylinder fueling. Current may flow into the ignition coil when a switch or driver is closed to permit current to flow from an energy source to the ignition coil. In one example, ignition coil driver 202 (of FIG. 2) closes after receiving an ignition dwell command from the controller. The current is applied for a duration d1 (from t1 to t2) known herein as the dwell time. As such, the dwell command may specify the dwell time d1. Further, based on the dwell time, the peak current I1 attained in the ignition coil may vary. Specifically, as the dwell time d1 is increased, the peak current I1 applied to the ignition coil may increase. Since the peak current is proportional of the spark energy during the ensuing spark event, by increasing the dwell time and the peak current, the ignition output of the resulting spark event is increased.

At time t2, current flow to the primary side of the ignition ceases in response to the desired spark timing causing the secondary side of the ignition coil to discharge and induce current flow between the ignition coil and the spark plug. The ignition coil current decays as time increases. In one example, ignition coil driver 202 (of FIG. 2) opens at time t2 in response to the command from the controller. As a result of the discharging, the spark event lasts for a duration d2.

As elaborated herein, by increasing the dwell time d1 of the ignition coil as the proportion of fuel that is direct injected increases, and/or as the alcohol content of the direct injected fuel increases, the ignition output can be increased to improve the robustness of the spark event.

Referring now to FIG. 7, example signals for two ignition coils supplying electrical energy to a single, common spark plug are shown at map 700. The signals may be provided by the dual coil ignition system shown in FIG. 3. Map 700 depicts a first charging current applied to a first ignition coil (such as coil 306 of FIG. 3) at plot 702, and depicts a second charging current applied to a second ignition coil (such as coil 308 of FIG. 3) at plot 704. The first and second charging currents are applied to provide energy for a spark event during a cylinder cycle. Map 700 further depicts a discharge current from the first and second ignition coils at plot 706. Vertical markers t0-t9 represent times of interest during the sequence.

At time t0, the ignition coils are neither charging nor discharging. An ignition coil may not be charging or discharging during an intake or exhaust stroke of the cylinder receiving the spark, for example.

At time t6, current begins to flow into the first ignition coil at a primary side in response to a desired spark timing that is based on engine speed, load, and further based on cylinder fueling. Current may flow into the first ignition coil when a switch or driver is closed to permit current to flow from an energy source to the first ignition coil. In one example, ignition coil driver 302 (of FIG. 3) closes after receiving a command from the controller. The current is applied for a duration d11 (from t6 to t7) known herein as the first dwell time of the first ignition coil. As such, the first dwell command may specify the first dwell time. Further, based on the first dwell time, the peak current I11 attained in the ignition coil may vary. Specifically, as the first dwell time d11 is increased, the peak current I11 applied to the first ignition coil may increase. Since the peak current is proportional of the spark energy during the ensuing spark event, by increasing the dwell time and the peak current, the ignition output of the resulting spark event is increased.

At time t7, current begins to flow into the second ignition coil at a primary side in response to a desired spark timing that is based on engine speed, load, and further based on cylinder fueling. Current may flow into the second ignition coil when a switch or driver is closed to permit current to flow from an energy source to the second ignition coil. In one example, ignition coil driver 304 (of FIG. 3) closes after receiving a command from the controller. The current is applied for a duration d12 (from t7 to t8) known herein as the second dwell time of the second ignition coil. As such, the second dwell command may specify the second dwell time. Further, based on the second dwell time, the peak current I12 attained in the ignition coil may vary. Specifically, as the second dwell time d12 is increased, the peak current I11 applied to the second ignition coil may increase. Since the peak current is proportional of the spark energy during the ensuing spark event, by increasing the dwell time and the peak current, the ignition output of the resulting spark event is increased.

At time t8, current flow to the primary side of the first ignition coil ceases in response to the desired spark timing causing the secondary side of the first ignition coil to discharge and induce current flow between the ignition coil and the spark plug. The first ignition coil current decays as time increases. At time t9, current flow to the primary side of the second ignition coil ceases in response to the desired spark timing causing the secondary side of the second ignition coil to discharge and induce current flow between the ignition coil and the spark plug. In particular, a time delay d13 elapses between the discharging of the first coil at t8 and the discharging of the second coil at t9. As discussed earlier, this time delay d13 may be adjusted based on cylinder fueling. For example, time delay d13 may be increased as the alcohol content of the injected fuels increase and/or as the proportion of fuel delivered via direct injection increases. The second ignition coil current bolsters current from the first ignition coil extending spark duration and spark energy. Thus, as I11 and I12 is increased, and further as d13 is increased up to a threshold, the spark ignition event may be extended and ignition performance and robustness may be improved. In this way, by adjusting the dwell command applied to each ignition coil of a dual coil ignition system, spark duration and energy may be increased so as to improve combustion stability in cylinders.

Now turning to FIG. 8, maps 800 and 850 depict example trends in the change in ignition coil dwell command and discharge delay as fuel type changes and further as injection type changes.

Map 800 depicts a change in ignition energy along the y-axis in relation to a change in injection type along the x-axis, which is also dependent on engine speed-load conditions. Map 850 depicts a change in discharge delay along the y-axis in relation to a change in injection type along the x-axis, which is also dependent on engine speed-load conditions. As such the trend shown in map 850 may be for a delay between discharging of each ignition coil of a dual coil ignition system while the trend shown in map 800 may be for a single ignition coil in a single coil ignition system, or both ignition coils of a dual coil ignition system. As such, the ignition energy, discharge delay and dwell time requirements may be engine speed range specific in addition to being affected by the portion of fuel that is direct injected relative to port injected, as well as based on the split ratio of fuel that is direct injected in an intake stroke versus a compression stroke.

As engine speed and load increases, the port injected fuel fraction increases relative to the direct injected fuel fraction. As shown, a higher ignition energy is applied at low engine speed-load conditions where the direct injected fuel fraction is higher (e.g., 100% DI). And again a higher ignition energy is applied at high engine speed-load conditions where the port injected fuel fraction is higher (e.g., majority PFI). Higher ignition energy as well as higher discharge delay is applied at low engine speed and load conditions to overcome low arc effectiveness due to low charge motion. At high engine speed and load conditions, higher ignition energy is applied but a lower discharge delay is applied to increase the total secondary current. This makes the arc more resistant to blowout caused by high charge motion.

In one example, for a given fuel, as the fraction of fuel delivered via direct injection decreases (and the fraction of the given fuel delivered via port injection decreases), discharge delay is decreased and ignition energy is increased. In addition, as the alcohol content of the direct injected fuel (relative to the port injected fuel) increases, the ignition energy is increased and the discharge delay is increased. As such, the trends shown in the maps of FIG. 8 are general trends. It will be appreciated that the ignition requirements for direct injection split injections (where at least a portion of the direct injected fuel is delivered via an intake stroke direct injection and another portion of the fuel is delivered via a compression stroke direct injection) may depend, in addition to engine speed and load conditions, on the overall air-fuel ratio of combustion. For example, the ignition energy and discharge delay requirements for a split direct injection may depend on the air-fuel ratio of the majority of the in-cylinder fuel mass versus the air-fuel ratio of the fuel mass around the spark plug. Thus, if the in-cylinder mass is overall lean (leaner than stoichiometry) and the fuel mass from a later compression stroke direct injection is timed to arrive at the spark plug at the time of spark, the ignition energy and delay requirements may be lessened.

Based on less homogeneity overall, a higher ratio of direct injection may require more ignition coil discharge delay to give exposure to more charge during a spark event. A higher direct injection fraction may also coincide with lower engine speeds and loads which result in less charge motion, less arc stretching, and therefore a less effective arc. Increased discharge delay with a longer overall spark duration may help to overcome this issue.

It will be appreciated that in further examples, the ignition energy usage may need to be tailored to the specific combustion chambers. For example, the ignition profile required in a first engine may differ from the ignition profile required in a second engine configured differently from the first engine. Likewise, the direct injection split ratio, as well as the arrangement of the direct injector at a side location or a central location of the combustion chamber may also impact ignition energy. Further still, the use of stratified charge versus homogeneous charge may also impact the ignition energy and the way output of the ignition coils is managed in a single spark plug.

Further, the discharge delay may be adjusted as a stronger function of in-cylinder motion and engine speed, as compared to ignition energy. Typically as the kernel flame is developing, it can be blown away from the gap, and sometimes may burn out. The second discharge (from the second ignition coil) can serve to anchor the flame kernel within the gap or start igniting a new combustible mixture that now exists within the gap.

Figure 9:
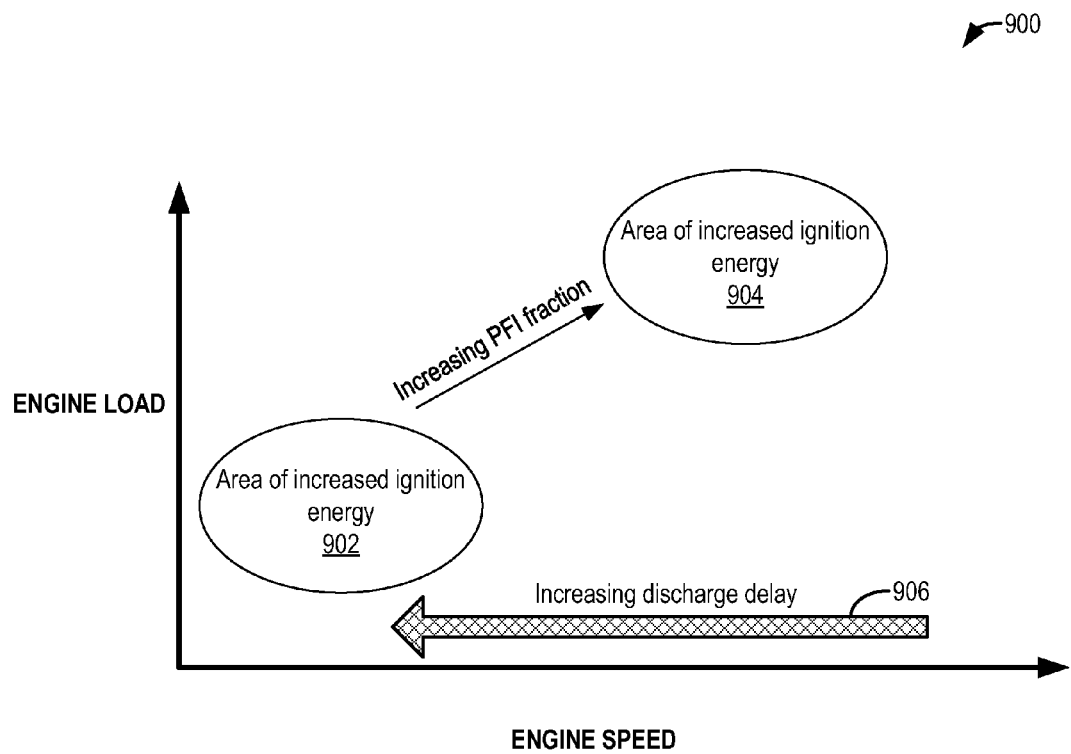
FIG. 9 shows an example adjustment in ignition output with changing cylinder fueling, according to the present disclosure.

Now turning to FIG. 9, an example of how spark is adjusted as cylinder fueling changes and as engine speed and load conditions change is shown at map 900.

During lower engine speed and load conditions, spark is operated at an area of increased ignition energy 902. In this area, the engine is operated with a relatively higher fraction of direct injected fuel. In comparison, during higher engine speed and load conditions, spark is operated at an area of increased ignition energy 904. In this area, the engine is operated with a relatively higher fraction of port injected fuel. In addition, as engine speed increases, and consequently charge motion increases, a discharge delay between ignition coil firings (in a dual coil system) is decreased, as indicated by arrow 906.

Thus, increased ignition energy with increased discharge delay is applied in operating area 902 to combat the reduced spark plug efficiency due to reduced charge motion. In particular, the increased ignition energy combats the reduced arc stretching in this operating region. In comparison, increased ignition energy with reduced discharge delay is applied in area 904 to combat spark blowout.

In one example, an engine system comprises an engine cylinder including a single spark plug; an ignition system including a first ignition coil and a second ignition electrically coupled to the single spark plug; a port injector for port injecting a first fuel to the cylinder; and a direct injector for direct injecting a second fuel to the cylinder. The engine system may further include a controller including instructions stored in non-transitory memory to supply different charging current times via a single conductor to the first and the second ignition coils, the different charging current times based on the first and second fuels, and further based on a proportion of cylinder fueling via the direct injector relative to the port injector; and discharge each of the first and second ignition coil to the single spark plug. The controller may also include further instructions for adjusting a delay between discharging the first ignition coil and discharging the second ignition coil to the single spark plug based on the cylinder fueling. The different charging current times may include a first charging current provided to the first ignition coil and a second charging current provided to the second ignition coil. In one example, the first charging current is increased by a larger amount and the second charging current is increased by a smaller amount as the proportion of cylinder fueling received via the direct injector increases relative to the port injector. Herein, each of the first charging current, second charging current, and delay may be further adjusted by the controller based on ignitability of a first fuel delivered via the direct injector relative to ignitability of a second fuel delivered via the port injector. For example the delay may be decreased as a difference in ignitability between the first fuel and the second fuel increases. The controller may convert the two different ignition coil charging current times into two ignition coil commands. In addition, the controller may operate two ignition coil drivers in response to the two ignition coil commands. Further, the first ignition coil charging current may be supplied at a first time including a first engine crankshaft angle while the second ignition coil charging current may be supplied at a second time including a second engine crankshaft angle. The first engine crankshaft angle may be retarded or advanced from the second engine crankshaft angle.

In a further representation, a method for providing spark to an engine, comprises, supplying a first ignition coil charging current time to a first ignition coil via a first conductor; supplying a second ignition coil charging current time to a second ignition coil via a second conductor; and discharging the first ignition coil and the second ignition coil to a single spark plug of a cylinder, the discharging of the second ignition coil delayed relative to the discharging of the first ignition coil. Herein, each of the first ignition coil charging current, second ignition coil charging current, and delay between the discharging of the first and second ignition coil is adjusted based on a ratio of port injected fuel relative to direct injected fuel received in the cylinder. The first ignition coil charging current time may be provided via a first pulse width and the second ignition coil charging current time may be provided via a second pulse width, the first pulse width longer than the second pulse width. In addition, the first ignition coil charging current time and the second ignition coil charging current time may be supplied synchronous with an engine position.

In this way, spark robustness may be improved in a dual fuel injection system. By adjusting the ignition command based on the fuel fraction that is direct injected relative to the fraction that is port injected, the ignition output may be better matched to the ignition need of that specific injection type. As such, this reduces over-usage of spark energy without compromising spark performance. By also adjusting the ignition output based on the fuel delivered via the specific injection type, spark usage may be further optimized. Overall, an ignition output may be adjusted to better match the ignition requirement of the given fuel type and injection type combination.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting an ignition coil dwell time for a cylinder spark event based on fuel received in the cylinder via port injection relative to direct injection.

2. The method of claim 1, wherein the adjusting includes adjusting based on a proportion of a total amount of fuel that is received in the cylinder via the port injection relative to the proportion of the total amount of fuel that is received in the cylinder via the direct injection.

3. The method of claim 2, wherein the adjusting further includes adjusting based on a first fuel received in the cylinder via the port injection relative to a second fuel received direct injection.

4. The method of claim 3, wherein the engine includes a single coil ignition system and wherein the adjusting includes, in response to a higher proportion of the total amount of fuel being delivered via direct injection at lower engine speeds and loads, increasing the ignition coil dwell time, and in response to a higher proportion of the total amount of fuel being delivered via port injection at higher engine speeds and loads, increasing the ignition coil dwell time.

5. The method of claim 4, wherein the adjusting further includes, as the alcohol content of the second fuel delivered via direct injection increases, increasing the ignition coil dwell time.

6. The method of claim 3, wherein the engine includes a dual coil ignition system having a first ignition coil and a second ignition coil coupled to a common cylinder spark plug, and wherein the adjusting includes, in response to a higher proportion of the total amount of fuel being delivered via direct injection, increasing the dwell time of at least the first ignition coil.

7. The method of claim 6, wherein the first ignition coil is charged and discharged earlier than the second ignition coil, and wherein the adjusting further includes increasing a time between discharging of the first coil and discharging of the second coil as the proportion of the total amount of fuel delivered via the direct injection increases.

8. The method of claim 1, wherein the adjusting includes adjusting from an initial dwell time estimate based on engine operating conditions including engine speed and load to a final dwell time estimate based on fuel received in the cylinder via port injection relative to direct injection.

9. A method for an engine, comprising:
during a cylinder spark event,
adjusting a dwell time of each of a first ignition coil and a second ignition coil coupled to a cylinder spark plug based on cylinder fueling via a direct injector and via a port injector.

10. The method of claim 9, further comprising, adjusting a time elapsed between discharging of the first ignition coil and discharging of the second ignition coil based on the cylinder fueling.

11. The method of claim 10, wherein the cylinder fueling includes a first fuel received in the cylinder via the port injector and a second fuel received in the cylinder via the direct injector.

12. The method of claim 11, wherein the dwell time of the first ignition coil is increased and the dwell time of the second ignition coil is increased as a difference in alcohol content between the first fuel and the second fuel increases.

13. The method of claim 12, wherein the time elapsed between discharging of the first ignition coil and discharging of the second ignition coil is increased as the difference in alcohol content between the first fuel and the second fuel increases.

14. The method of claim 13, wherein the cylinder fueling further includes a relative proportion of the cylinder fueling received via the direct injector as compared to the port injector.

15. The method of claim 14, wherein the dwell time of the first ignition coil is increased and the dwell time of the second ignition coil is increased as the relative proportion of cylinder fueling delivered via the direct injector increases.

16. The method of claim 15, wherein the time elapsed between discharging of the first ignition coil and discharging of the second ignition coil is increased as the relative proportion of cylinder fueling delivered via the direct injector increases.

17. An engine system, comprising:
an engine cylinder including a single spark plug;
an ignition system including a first ignition coil and a second ignition electrically coupled to the single spark plug;
a port injector for port injecting a first fuel to the cylinder;
a direct injector for direct injecting a second fuel to the cylinder; and
a controller including instructions stored in non-transitory memory to:
supply different charging current times via a single conductor to the first and the second ignition coils, the different charging current times based on the first and second fuels, and further based on a proportion of cylinder fueling via the direct injector relative to the port injector; and
discharge each of the first and second ignition coil to the single spark plug.

18. The system of claim 17, wherein the controller includes further instructions for adjusting a delay between discharging the first ignition coil and discharging the second ignition coil to the single spark plug based on the cylinder fueling.

19. The system of claim 18, wherein the different charging current times include a first charging current provided to the first ignition coil and a second charging current provided to the second ignition coil, and wherein the first charging current is increased by a smaller amount and the second charging current is increased by a larger amount as the proportion of cylinder fueling received via the direct injector increases relative to the port injector.

20. The system of claim 19, wherein each of the first charging current, second charging current, and delay is further adjusted based on ignitability of a first fuel delivered via the direct injector relative to the ignitability of a second fuel delivered via the port injector, the delay decreased as a difference in ignitability between the first fuel and the second fuel increases.

* * * * *